United States Patent [19]

Reutler et al.

[11] Patent Number: 4,795,607
[45] Date of Patent: Jan. 3, 1989

[54] HIGH-TEMPERATURE REACTOR

[75] Inventors: Herbert Reutler, Köln; Günter Lohnert; Johannes Lukaszewicz, both of Bergisch Gladbach, all of Fed. Rep. of Germany

[73] Assignee: GHT, Gesellschaft für Hochtemperaturreaktor-Technik mbH, Bergisch-Gladbach, Fed. Rep. of Germany

[21] Appl. No.: 43,844

[22] Filed: Apr. 29, 1987

Related U.S. Application Data

[63] Continuation-in-part of Ser. No. 526,212, Aug. 24, 1983, which is a continuation of Ser. No. 241,923, Mar. 9, 1981, abandoned.

[30] Foreign Application Priority Data

Mar. 12, 1980 [DE] Fed. Rep. of Germany ....... 3009390

[51] Int. Cl.$^4$ .................. G21C 9/00; G21C 15/18
[52] U.S. Cl. .................. 376/299; 376/908; 376/911; 376/294
[58] Field of Search ............. 376/381, 382, 299, 298, 376/911, 294–296, 908

[56] References Cited

U.S. PATENT DOCUMENTS

| | | | |
|---|---|---|---|
| 3,100,187 | 8/1963 | Fraas | 376/381 |
| 3,228,852 | 1/1966 | Holmes et al. | 376/381 |
| 3,321,876 | 5/1967 | Machnig et al. | 376/381 |
| 3,371,017 | 2/1968 | Coast et al. | 376/296 |
| 3,830,695 | 8/1974 | Sauvage | 376/298 |
| 3,941,187 | 3/1976 | Jabsen et al. | 376/911 |
| 4,061,534 | 12/1977 | Jackson | 376/298 |
| 4,152,204 | 5/1979 | Maly et al. | 376/381 |
| 4,189,347 | 2/1980 | Reutler et al. | 376/381 |
| 4,314,883 | 2/1982 | Fritz et al. | 376/381 |
| 4,486,380 | 12/1984 | Schweiger et al. | 376/381 |

FOREIGN PATENT DOCUMENTS

| | | | |
|---|---|---|---|
| 2623978 | 12/1977 | Fed. Rep. of Germany | 376/299 |
| 3009390 | 9/1981 | Fed. Rep. of Germany | 376/381 |
| 0132684 | 11/1978 | Japan | 376/381 |

Primary Examiner—Harvey E. Behrend
Attorney, Agent, or Firm—Herbert L. Lerner; Laurence A. Greenberg

[57] ABSTRACT

Gas-cooled high-temperature nuclear reactor having a reactor core comprising individual fuel elements provided with means for forming a barrier against the release of fission products producible therein during reactor operation, the fuel elements being received in a cylindrical barrel formed of an inner graphite layer functioning as a reflector, an outer layer of insulating material surrounding the inner layer, and a metallic receptacle, the inner and outer layers and the receptacle being formed of respective side, bottom and cover portions, the side and cover portions of the inner layer being formed with first channels into which means for controlling the reactors are insertable, the bottom, side and cover portions of the inner layer being further formed with second channels wherein, during reactor operation, cooling gas is circulated under pressure from the bottom to the top of the receptacle, the bottom portion of the inner layer having first openings for introducing cooling gas into the second channels during reactor operation and second openings for withdrawing during reactor operation cooling gas heated by passage through the reactor core; the inner and outer layers and the cylindrical core barrel having a heat conductivity and a thermal capacity and the reactor core having such a size, shape, power density and moderation ratio that a first temperature at which the core becomes subcritical for all possible accident conditions is below a second temperature at which the barrier means are destroyed, and, when loss of pressure of the cooling gas is experienced, after-heat generated in the core being removable by heat conduction and radiation through the inner and outer layers and the core barrel to a heat sink located outside the receptacle, in such a way that the fuel elements remain at a temperature below the second temperature.

2 Claims, 1 Drawing Sheet

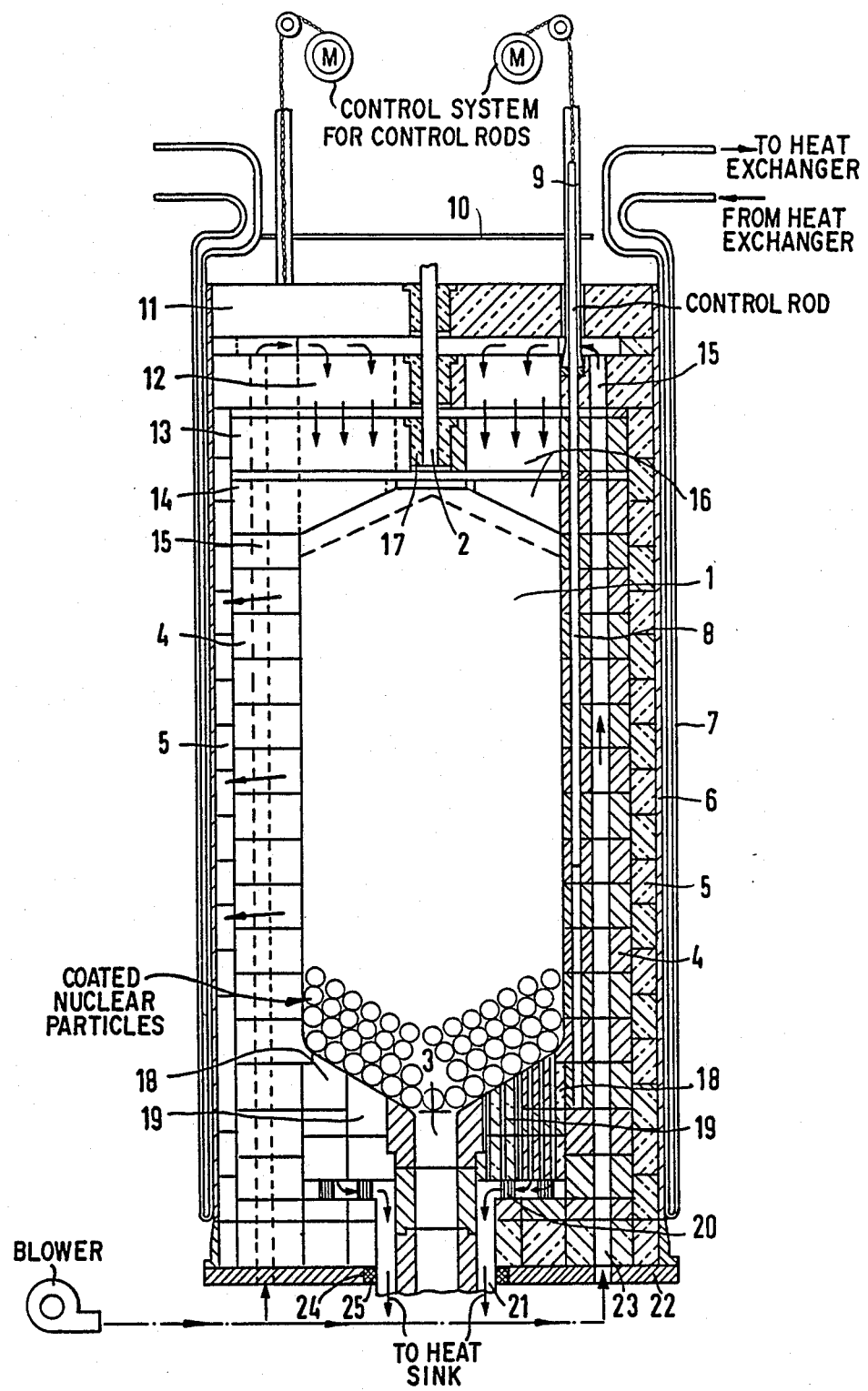

HIGH-TEMPERATURE REACTOR

This is a continuation-in-part application of our application Ser. No. 526,212, filed Aug. 24, 1983 which was a continuation application of our parent application Ser. No. 241,923, filed Mar. 9, 1981, now abandoned.

The invention relates to a gas-cooled high-temperature nuclear reactor having a reactor core formed of individual fuel elements provided with a barrier against the release of fission products producible therein during reactor operation.

Nuclear reactors of this general type are well known in the art, such as the AVR reactor at Jülich, Germany, described in the May 1966 issue of the German periodical Atomwirtschaft, in which the reactor core consists of spherical fuel elements forming a so-called pebble bed, and the Fort St. Vrain reactor in the U.S.A., described in the December, 1969 issue of Nuclear Engineering International, p. 1069 to 1093, with a reactor core built up of block-shaped fuel elements stacked side by side and one on top of the other. Irrespective of their shape and size, the basic composition of these fuel elements is always the same: minute particles of nuclear fuel in a heat-resistant ceramic form, such as uranium dioxide and/or carbide, are individually covered with a substance impervious or forming a barrier, at the envisaged temperature of operation of the reactor, to the radioactive products generated by the nuclear fission process, such as cesium and iodine, the release of which to the environment could cause serious radioactive pollution and which must therefore be prevented. Preferentially, such cover or coating of the fuel particles has been made of silicon carbide and/or pyrolitic carbon. The coated fuel particles, in their turn, are embedded in a matrix of graphite chosen for its moderating properties, and the spherical type of fuel element as a whole is finally provided with a macroscopic outer layer of graphite. It has been found that the aforesaid coated fuel particles will reliably prevent the release of fission products even when heated to a temperature of up to 1400 .C., i.e. to a temperature far in excess of the normal operating temperature of nuclear reactors of the aforesaid type which, using helium as a coolant, is in the 700 to 1000 .C. range because of the limitations imposed by the resistance of present-day metallic structural materials to permanent exposure to high temperatures. It is believed that further improvements in the composition and fabrication of fuel elements of the aforesaid type (fully described in the Transactions of the American Nuclear Society, v. 33, p. 294–314, San Francisco 1979) may eventually permit an increase in the maximum temperature at which the barrier preventing the release of fission products breaks down.

It has also been shown that a reactor core composed of fuel elements of this type has a markedly negative temperature coefficient, i.e. its reactivity tends to become less when overheated.

Taking into account the aforesaid limitations imposed, on the one hand, by the properties of the materials available for reactor construction and, on the other hand, by the desirability of attaining high operation temperatures in order to provide heat generated by nuclear fission for industrial applications that require heat at a high temperature level for their implementation, a reactor construction has evolved in which an outer gas-tight, metallic shell is protected by ceramic insulation from the high temperature of the coolant gas circulating within. This insulation is also provided to protect a metal receptacle, which houses the reactor core, from the heat generated within the fission zone. Carbon blocks have been used for this kind of insulation. A further layer of graphite has been used to line this insulation and to serve as a neutron reflector for the reactor core.

In addition to being able to reduce the specific investment costs by increasing the reactor power, calculations show that the fuel cycle economy improves with unit size, and accordingly development has been from the AVR reactor mentioned above, with an output of 45 $MW_{th}$, through the THTR reactor at Uentrop, Germany, presently under construction (and described in the May, 1971 issue of Atomwirtschaft) with an output of 750 $MW_{th}$ to projects now under discussion for reactors with outputs up to 3000 $MW_{th}$. These latter reactors all rely on active means for their safety, the importance of which becomes more vital as their size increases. For effective interruption of the nuclear chain reaction, for example, they require that absorber rods be inserted into the fission zone; in the case of a pebble-bed core, this means that insertion of the rods is not possible by the inherently secure action of gravity alone, but must be assisted by some sort of external force. In accordance with common reactor construction practice, a number of redundant back-up devices exerting this force have to be provided in order to secure reactor shut-down even if some of them should fail. Likewise, after shut-down, the action of blowers is required in order to remove the after-heat generated in the fission zone and to prevent the fuel elements from becoming overheated beyond the temperature stipulated above at which release of fission products begins. There again, back-up blowers must be provided, which like other redundancies push up investment costs for a nuclear plant of the aforesaid type. It is the contention of the present application that this increase in investment costs tends to cancel out the savings accuring from economies of scale and of the aforesaid improvement in fuel cycle costs. The reliance of the heretofore known power reactors, not only of the gas-cooled high temperature variety, on active means for their safety, to be initiated either by the operating personnel or by some automatic appliance, and the necessity to provide against the malfunctioning of such active means have until now been accepted features of nuclear reactor construction philosophy.

Thus, in German Pat. No. 21 60 507, a device for cooling the components of a gas-cooled reactor core and for removing the after-heat liberated after the shut-down of the nuclear reactor is described, by which the cooling of the components and also the removal of the after-heat is supposed to be ensured regardless of the type of disturbance which may occur in the reactor cooling-gas loop. The after-heat is transferred from the core to special fin coolers by means of special blowers which are turned off during power operation, and by dampers which are closed during power operation. In the event of a failure of the blowers, some of the dampers are closed and others opened, the flow direction is reversed and the after-heat is transferred to the fin cooler from the core by natural circulation. This after-heat removal is therefore dependent on active measures in the primary loop. However, in the event of a failure of the blowers, metallic parts above the core are endangered by high temperatures; if the reactor is without pressure, the heat removal by natural convection is inadequate; also, in the event of an air break-in, air is transported into the core by the natural convection.

In German Published Non-Prosecuted Application (DE-OS) No. 26 23 978, a high-temperature reactor is described wherein the after-heat is to be removed by the head or cover reflector. The problems sought to be solved by the invention of the instant application are also already described therein. This ceiling or cover cooling is functional also in the natural circulation mode and can be performed independently of active measures by continuous operation of this natural-circulation loop. However, this head or cover construction depends upon metallic structural parts which, on the one hand, carry the coolant and, on the other hand, support the ceiling of cover which is formed of numerous graphite blocks. Calculations have also shown that the ceiling or cover reflector cooling alone is insufficient for removing the after-heat at representative temperatures of the fuel assemblies if the operating pressure drops below about 10 bar.

It is accordingly an object of the invention of the instant application to provide a nuclear reactor of the aforesaid general type which does not suffer from the shortcomings resulting from the above-mentioned philosophy, but instead relies for its safety only on passive means, i.e. such as necessarily follow from the interaction of the laws of nature with certain structural features, hereinafter to be described.

With the foregoing and other objects in view, there is provided, in accordance with the invention, a gas-cooled high-temperature nuclear reactor having a reactor core formed of individual fuel elements provided with means for forming a barrier against the release of fission products producible therein during reactor operation in a cylindrical receptacle formed of an inner graphite layer functioning as a reflector, an outer layer of insulating material surrounding the inner layer, and a metallic receptacle. The inner and outer layers and the receptacle are formed of respective side, bottom and cover portions, and the side and cover portions of the inner layer are provided with first channels into which means for controlling the reactor are insertable. The bottom, side and cover portions of the inner layer are further formed with second channels wherein, during reactor operation, cooling gas is circulated under pressure from the bottom to the top of the receptacle, the bottom portion of the inner layer having first openings for introducing cooling gas into the second channels during reactor operation and second openings for withdrawing during reactor operation cooling gas heated by passage through the reactor core. The inner and outer layers and the core barrel have a heat conductivity and thermal capacity, and the core has such a size, shape, power density and moderation ratio that a first temperature at which the core becomes subcritical for all possible accident conditions is below a second temperature at which the barrier is destroyed and, when loss of pressure of the cooling gas is experienced, the after-heat generated in the core is removable by heat conduction, convection and radiation through the inner and outer layers and the core barrel to a heat sink located outside the receptacle, in such a way that said fuel elements remain below the second temperature.

This reactor exploits fully the known good properties of fuel elements composed of a large number of individual fuel particles each provided with a coating which is impervious to fission products up to an elevated second temperature by ensuring that under no condition will this second temperature be reached even when malfunction of any or all customary safety appliances is assumed. Some of these appliances may be altogether dispensed with and others may be considerably simplified because they no longer have to fulfill a safety function, but merely improve the ease or economy of normal reactor operation: thus the reactor control means referred to above will still be used, in normal operation, to shut down the reactor and blowers for the circulation of coolant gas through the reactor core and will likewise be used to remove after-heat from it in the shut-down condition in order to reduce the time required to reach the cold sub-critical condition in which repairs may be initiated. All of this is with the knowledge, however, that none of this operation may become critical by failure: if the reactor control means fail to stop a power excursion, either through a mechanical breakdown, or through the reactor operator's error, or even through willful sabotage, the reactor will become subcritical of its own self at a first temperature in excess of its normal operating temperature. If the blowers which are intended to remove the after-heat generated in the core (which, right after shut-down, is about 3% of the full power rating) under these conditions fail as well in the long run (i.e. after 32 hours for the preferred reactor embodiment described below), the removal of an amount of heat is still ensured which will at least balance the amount of heat freshly generated.

Mechanical as well as temperature and neutron induced damage to the fuel elements will, at the worst, breach the barriers of a very few of the coated fuel particles; the amount of fission products released thereby is only a minimal fraction of the whole inventory and will be well within tolerable limits. Mechanical damage to the components making up the coolant loop may cause a breach in the integrity of the same, leading to an escape of the major part of the coolant gas and consequent loss of pressure; even then, when heat removal from the reactor core is no longer possible by a coolant gas circulation driven by natural convection, removal by conduction and radication via the core barrel itself will suffice. Because the inner layer has cooling channels traversable, during power operation, by cooling gas prior to entry thereof into the reactor core, the continuous cooling of this layer (the side of lateral reflector) in power operation increases the heat capacity of the latter in the event of damage without increasing the volume thereof. A cooled reflector can absorb more heat in the event of damage than a reflector having a temperature which already corresponds to the core temperature in power operation. Because of their comparatively modest size, the layers lining the core barrel can be constructed without having recourse to metallic components that are exposed directly to the heat generated within the fission zone. Thus, failure of the core barrel lining because of overheating of crucial components, such as a collapse of the top reflector limiting the space allocated to the core, can be ruled out. By having all of the after-heat removed through the walls of the core-barrel alone, without having recourse to a circulation of the coolant gas to other parts of the plant, such as the steam generators, the consequences of an ingress of air or steam into the core barrel (which would corrode the graphite at high temperatures) are minimized.

For the construction of the individual structural parts of this reactor, several alternatives are, of course, available which will be described hereinafter. The physical characteristics which are of interest in this regard, such as heat-transfer coefficients, thermal conductivity and heat or thermal capacity of the materials, such as graphite and carbon blocks, usable in high-temperature reactors are known to those skilled in the art.

In accordance with another feature of the invention, the external heat sink comprises a plurality of U-shaped tubes forming part of a water-filled cooling loop, one leg of the U-shaped tubes being arranged in heat transfer relationship to the metallic core barrel. This feature provides an external heat sink in which a circulation of coolant is set up by natural convection, so that there is no necessity to start it by active means in case of need. It will in fact be operative whenever heat is generated within the reactor, which means that it will cause a thermal loss of about 0.2% of the full power rating. Heretofore known reactor designs have sought to reduce heat losses from the reactor vessel to well below this figure in the interest of increased thermal efficiency. The reactor of the instant application, however, purposely foregoes such efficiency for reduced plant cost (because no additional emergency cooling loops must be provided) and for an increase in inherent safety. It is of considerable importance that the heat transfer from the core to the heat removal system be not excessive because, otherwise, the heat-removal system could be imperiled, and also that it be not too little because, otherwise, the temperatures in the core could rise too high. The after-heat is initially stored in the fuel assemblies and the reflector and then transferred to the heat-removal system. The active heat removal systems formed of several redundant cooling loops with blowers and heat exchangers, which were required heretofore, can be eliminated. These heretofore employed emergency cooling loops, through which a gas stream flows continuously, had considerable surface areas which in the event also of necessity caused heat losses.

In accordance with a concomitant feature of the invention, the core has a moderation ratio (number of graphite atoms to number of fuel atoms) of substantially 500 to 800. Reactivity accidents, for example, due to water or steam break-in, are limited by this high moderation ratio This makes the requirements as to the shutdown rods less stringent.

In power operation, the reactor according to the invention can be controlled by means of the negative temperature coefficient of the reactivity i.e. by changing the blower power.

In accordance with another feature of the invention, a pebble-bed reactor using spherical fuel elements of, for example, 60 mm diameter containing fuel particles provided with a barrier against the release of fission products effective up to a second temperature of 1400 .C., and using helium as a cooling gas, has a maximum power output of up to substantially 200 MW thermal, an average power density of substantially 3 MW/m$^3$ of core volume, and a maximum local power density of substantially 4 MW/m$^3$ of core volume, a power production of substantially 20 MW/m of core height, a core diameter of substantially 3 m, and a heat transfer, for fuel elements having attained the second temperature and with the coolant gas at atmospheric pressure, of substantially 3 to 6 KW/m$^2$ of the outer surface of the receptacle. This, in applicants' opinion, represents the optimum attainable with present-day materials. These data are based upon and pertain to heretofore known and conventional reactor materials and heretofore known material characteristics and temperatures considered to be permissible, and offer more detailed instructions to a reactor expert for the construction of the reactor according to the invention. This is a considerable difference over the large power reactors planned heretofore, wherein a core optimized particularly with respect to fuel cycle costs was sought after within the technology limits. This resulted in high mean power densities, high burn-up, large power units, small temperature coefficients and a small moderation ratio. For such a core, costly control and instrumentation systems, redundant and diverse shutdown devices and after-heat removal cooling chains were necessary which gave rise to considerable costs and thereby negate the advantages of a core optimized for low fuel cycle costs. The person skilled in the art will however be able to modify the above parameters if, as is to be expected, the quality of the materials available or our understanding of them increases, without departing from the scope and spirit of the invention.

In accordance with yet another feature of the invention, a power plant of a specified output exceeding the maximum power output of any one of the aforementioned reactors according to the invention of the instant application is constructed by connecting a plurality of them in parallel with one another. The advantages accruing from an increased plant availability (only part of it need be shut down at any one time for overhaul, and the like.), easier erection of components of modest size, the economies to be expected in the fabrication of whole series of identical components and from simplifications in obtaining planning permissions will outweigh the economic disadvantages usually to be expected from the use of small size units.

Other features which are considered as characteristic for the invention are set forth in the appended claims.

Although the invention is illustrated and described herein as embodied in a high-temperature reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiment when read in connection with the accompanying single FIGURE of the drawing which is a vertical longitudinal sectional view of a gas-cooled high-temperature pebble bed reactor according to the invention.

Referring now to the FIGURE of the drawing, there is shown a cylindrical core 1 of a gas-cooled high-temperature nuclear reactor formed of a non-illustrated bed of numerous spherical fuel assemblies, which enter into the core 1 through a loading tube 2 and leave the core 1 through a discharge tube 3. The core 1 is surrounded initially by an inner layer of numerous graphite reflector blocks 4 which have a circular-sector or ring-segment shape or also a trapezoidal cross section and are surrounded by an outer layer of insulating stacked carbon blocks 5 which likewise have a circular-sector or ring-segment shaped cross section and are held together by a steel receptacle or jacket 6. The steel receptacle 6 is cooled by numerous vertical U-shaped tubes 7 which are uniformly distributed around the circumference thereof.

In the two legs of the respective U-tubes 7, natural circulation is produced due to the different temperatures; this circulation leads the cooling water to an otherwise non-illustrated heat exchanger which is arranged outside the primary system of the reactor. The hot leg of these U-tubes is connected in heat transfer relationship to the steel receptacle 6 in order to absorb the after-heat from the reactor core.

The graphite blocks 4 of the side or lateral reflector contain, in the vicinity of the core, a first set of several vertical channels 8, uniformly distributed over the circumference, for containing non-illustrated control rods, which can be inserted into the reflector from the top through guide tubes 9. These guide tubes 9 are spaced from one another by a ring plate 10.

The ceiling of the reactor is formed, like in the AVR, of several layers of graphite or carbon blocks which are arranged on top of one another, have a sector-shaped cross section and are supported by the graphite blocks 4 and the carbon blocks 5 of the side or lateral wall. The uppermost blocks 11 of the reactor ceiling or cover are formed of carbon blocks and are closed except for holes provided for the absorber rod guides 9. The blocks 12, 13 and 14 of graphite which are located underneath are formed not only with a second set of channels 15 and the first channels 8 already provided in the reflector blocks 4, for receiving control rods therein, but also with several radial slots 16, through which the cooling gas enters into the core space. The blocks 11, 12 and 13 respectively support a rotary part 17 of graphite which is disposed in the longitudinal axis of the reactor and in which the loading tube 2 is guided.

In the bottom of the reactor, the discharge tube 3 is surrounded by several bottom blocks 18 and 19 which form a funnel-shaped bottom and are formed with numerous vertical holes through which the hot coolant flows off through an intermediate space supported by columns 20 and through an annular space 21 surrounding the discharge tube 3.

The receptacle 6 is provided with a base plate 22 which is formed with several holes 23 uniformly distributed over the circumference thereof and a central opening 24 which is protected from the emerging hot gas by insulation 25, which is not otherwise described in detail.

The gas entering through the holes 23 flows through an second channels 15 vertically upwardly, then through an intermediate space between the blocks 11 and 12 and through the slots 16 in the blocks 12, 13 and 14 down into the core 1. In normal operation, the side or lateral and ceiling or cover reflector are cooled. In the normal shutdown procedure of this reactor, the control rods are inserted and the blower power is throttled; in the process, the temperature in the core rises and the core becomes subcritical due both to the high negative temperature coefficient of the reactivity and to the inserted rods.

Thereafter, the reactor can be cooled down with reduced blower power to the cold, subcritical state. If the blowers fail, the reactor goes into the hot subcritical state due to the rising temperature, even without the control rods having been inserted. The heat stored in the fuel elements and the after-heat newly produced in them is thus distributed over the core and the reflector which subsequently gives off the heat through the insulation of carbon blocks 5 to the U-tubes 7. As long as the operating pressure in the primary loop of, for example, 50 bar is maintained, the heat exchange in the core is aided by internal convection. If the pressure drops, i.e. for example below 10 bar, this convection is no longer of great importance, so that the entire heat must and can be relinquished through conduction and radiation from the core, via the reflector and the insulation, to the U-tubes 7.

The following table contains the main design data of the illustrated reactor.

| | | |
|---|---|---|
| Thermal power output | MW | 125 |
| Height of core | m | 6.0 |
| Diameter of core | m | 3.0 |
| Average power density of the core | MW/m$^3$ | 2.94 |
| Reflector thickness | m | 0.75 |
| Single-zone core | | |
| OTTO(once through, then out)loading | | |
| Type of cycle | Uranium/Plutonium | |
| Heavy-metal loading/fuel element | g | 7 |
| Burn-up | GWd/t | 40 |
| Average exit temperature of coolant | °C. | 750 |
| Average entrance temperature of coolant | °C. | 250 |
| Number of reflector rods | | 20 |
| Thickness of reflector rods | cm | 8 |
| Reactivity data: | | |
| Temperature effect (20° C. to 750° C.) | % | 6 |
| Xenon effect | % | 3 |
| Maximum water break-in | % | 1 |
| Effectiveness of reflector rods | % | 12 |
| Effectiveness of one reflector rod | % | 0.5 |
| Initial enrichment | % | 5 |
| Temperature coefficient: | | |
| Equilibrium core | k/°C. | $-7 \cdot 10^{-5}$ |
| Xenon-free core | k/°C. | $-10 \cdot 10^{-5}$ |
| Fuel element dwelling time | d | 500 |
| Conversion rate | | 0.4 |
| Radial temperature difference | K | 120 |
| Maximum fuel element temperature in the equilibrium core | °C. | 850 |
| Maximum fuel element temperature after shutdown: | | |
| Reactor at pressure | °C. | 1200 |
| Loss of pressure accident | °C. | 1400 |
| Thickness of carbon block insulation | m | 0.25 |

We claim:

1. Gas-cooled high-temperature nuclear reactor having a reactor core comprising a multiplicity of individual particulate fuel elements received in a containment structure, said fuel elements being disposed laterally adjacent and on top of one another, each of said fuel elements being provided with means for forming a barrier against the release of fission products producible therein during reactor operation, said containment structure including a cylindrical barrel formed of an inner graphite layer functioning as a reflector, an outer layer of carbon bricks as insulating material surrounding said inner layer, and a metallic receptacle, said inner and outer layers being formed of respective side, bottom and cover portions, said cover portion being nonmetallic, said containment structure directly supporting said cover portion at the top of the cylindrical barrel exclusively by the side portions thereof, said side and cover portions of said inner layer being formed with first channels into which means for controlling a chain reaction in the reactor are insertible, said means being the sole insertion means for controlling the chain reaction in said reactor, said bottom, side and cover portions of said inner layer being further formed with second channels, means for circulating cooling gas during reactor operation through said second channels under pressure from the bottom to the top of said receptacle, and through the reactor core said bottom portion of said inner layer having first openings for introducing cooling gas into said second channels during reactor operation and second openings for withdrawing during reactor operation cooling gas heated by passage through the reactor core; said inner and outer layers and said metallic receptacle having a heat conductivity and a thermal capacity and the reactor core having such a size, shape, power density and moderation ratio that a first temperature at which said core becomes subcritical for all possible accident conditions is below a second temperature at which said barrier means are destroyed, and, when loss of pressure of said cooling gas down to about 10 bar or less is experienced, after-heat generated in said core is removable solely by heat conduction and radiation through said inner and outer layers and said core barrel to a passive heat removal system located outside said receptacle, so that said fuel elements remain at a temperature below said second temperature, said barrier being effective against the release of fission products up to a second temperature on the order of 1400° C., and said cooling gas being helium, the reactor having a maximum power output of up to substantially 200 MW thermal, an average power density of substantially 3 MW/m$^3$ of core volume and a maximum local power density of substantially 4 MW/m$^2$ of core volume, a power production of substantially 20 MW/m of core height, a core diameter of substantially 3 m, and a heat transfer, for fuel elements having attained said second temperature and with said cooling gas at atmospheric pressure, of substantially 3 to 6 KW/m of the outer surface of said receptacle, said graphite reflector and said carbon insulation, respectively, being formed of blocks disposed in the form of concentric rings, and said metallic receptacle comprising a cylindrical steel jacket surrounding said rings of blocks and holding them together, the after-heat from said nuclear core being removable solely through said side portion and said metallic receptable, when the pressure in said cylindrical barrel drops to about 10 bar or less, said passive heat removal system including a multiplicity of U-shaped tubes having coolant therein, said tubes being vertically disposed and uniformly distributed around the circumference of said cylindrical steel jacket, said tubes having a first leg in heat-transferring contact with said steel jacket and a second leg spaced from said steel jacket, a natural circulation of the coolant in said U-shaped tubes being produced due to a temperature difference in said first and said second legs thereof, and means for connecting said tubes with a heat exchanger located outside said metallic receptacle.

2. The reactor according to claim 1, wherein the reactor core has a moderation ratio of substantially 500 to 800.

* * * * *